(12) United States Patent
Edmondson et al.

(10) Patent No.: US 8,464,001 B1
(45) Date of Patent: Jun. 11, 2013

(54) CACHE AND ASSOCIATED METHOD WITH FRAME BUFFER MANAGED DIRTY DATA PULL AND HIGH-PRIORITY CLEAN MECHANISM

(75) Inventors: John H. Edmondson, Arlington, MA (US); David B. Glasco, Austin, TX (US); Peter B. Holmqvist, Cary, NC (US); George R. Lynch, Raleigh, NC (US); Patrick R. Marchand, Apex, NC (US); James Roberts, Austin, TX (US)

(73) Assignee: NVIDIA Corporation, Santa Clara ( * ) Notice: Subject to any disclaimer, the term of this patent is extended or adjusted under 35 U.S.C. 154(b) by 552 days.

(21) Appl. No.: 12/331,305

(22) Filed: Dec. 9, 2008

(51) Int. Cl.
*G06F 12/12* (2006.01)
*G06F 13/00* (2006.01)

(52) U.S. Cl.
USPC ............................ 711/133; 711/135; 711/143

(58) Field of Classification Search
USPC .................................. 711/133, 134, 135, 143
See application file for complete search history.

(56) References Cited

U.S. PATENT DOCUMENTS

| | | | | | |
|---|---|---|---|---|---|
| 4,493,026 | A | * | 1/1985 | Olnowich | 711/128 |
| 5,524,234 | A | * | 6/1996 | Martinez, Jr. et al. | 711/141 |
| 5,542,066 | A | * | 7/1996 | Mattson et al. | 711/136 |
| 5,579,473 | A | * | 11/1996 | Schlapp et al. | 345/557 |
| 5,680,572 | A | * | 10/1997 | Akkary et al. | 711/126 |
| 5,860,113 | A | * | 1/1999 | Tung | 711/144 |
| 5,895,488 | A | * | 4/1999 | Loechel | 711/135 |
| 6,119,205 | A | * | 9/2000 | Wicki et al. | 711/143 |
| 6,282,617 | B1 | * | 8/2001 | Tirumala et al. | 711/133 |
| 6,591,347 | B2 | * | 7/2003 | Tischler et al. | 711/134 |
| 6,766,431 | B1 | * | 7/2004 | Moyer | 711/168 |
| 6,920,533 | B2 | * | 7/2005 | Coulson et al. | 711/145 |
| 6,922,754 | B2 | * | 7/2005 | Liu et al. | 711/138 |
| 7,286,134 | B1 | * | 10/2007 | Van Dyke et al. | 345/544 |
| 2003/0084248 | A1 | * | 5/2003 | Gaither et al. | 711/133 |
| 2005/0102465 | A1 | * | 5/2005 | Royer | 711/1 |
| 2005/0278486 | A1 | * | 12/2005 | Trika et al. | 711/142 |
| 2007/0067572 | A1 | * | 3/2007 | Jiao et al. | 711/125 |
| 2007/0101064 | A1 | * | 5/2007 | Piry et al. | 711/128 |
| 2008/0244185 | A1 | * | 10/2008 | O'Krafka et al. | 711/135 |
| 2010/0138614 | A1 | * | 6/2010 | Glasco et al. | 711/144 |

* cited by examiner

*Primary Examiner* — Sanjiv Shah
*Assistant Examiner* — Glenn Gossage
(74) *Attorney, Agent, or Firm* — Patterson & Sheridan, LLP

(57) ABSTRACT

Systems and methods are disclosed for managing the number of affirmatively associated cache lines related to the different sets of a data cache unit. A tag look-up unit implements two thresholds, which may be configurable thresholds, to manage the number of cache lines related to a given set that store dirty data or are reserved for in-flight read requests. If the number of affirmatively associated cache lines in a given set is equal to a maximum threshold, the tag look-up unit stalls future requests that require an available cache line within that set to be affirmatively associated. To reduce the number of stalled requests, the tag look-up unit transmits a high priority clean notification to a frame buffer logic when the number of affirmatively associated cache lines in a given set approaches the maximum threshold. The frame buffer logic then processes requests associated with that set preemptively.

13 Claims, 8 Drawing Sheets

CACHE AND ASSOCIATED METHOD WITH FRAME BUFFER MANAGED DIRTY DATA PULL AND HIGH-PRIORITY CLEAN MECHANISM

BACKGROUND OF THE INVENTION

1. Field of the Invention

The present invention relates generally to the field of memory management and, more specifically, to a frame buffer managed dirty data pull and high-priority clean mechanism.

2. Description of the Related Art

One element of a memory subsystem within certain processing units is a Level 2 Cache memory (referred to herein as "L2 cache"). The L2 cache is a large on-chip memory that serves as an intermediate point between an external memory (e.g., frame buffer memory) and internal clients of the memory subsystem (referred to herein as the "clients"). The L2 cache temporarily stores data that the clients are reading from and writing to the external memory (referred to herein as dynamic random access memory or "DRAM").

In such a system, coherency has to be maintained between data present in the L2 cache and the data stored in the external memory. "Dirty data," that is, data transferred from a client to the L2 cache during a write operation, needs to remain in the L2 cache until it has been "cleaned," by replicating the data in the external memory. During a read operation, memory space is allocated within the L2 cache to receive the result data from the external memory. This allocated memory space remains unusable until the result data has been received from external memory by the L2 cache. Because the L2 cache receives a large number of write operations, substantial amounts of memory space in the data cache may be occupied with dirty data. Further read and write operations may be stalled until memory space becomes available in the L2 cache and applications, such as graphics processing, that require high data throughput may experience increased inefficiencies due to these issues.

As the foregoing illustrates, what is needed in the art is a technique to efficiently allocate memory space within an L2 cache for data associated with read and write operations.

SUMMARY OF THE INVENTION

One embodiment of the present invention sets forth a method for processing commands received by an intermediary cache from one or more clients, where the intermediary cache is coupled to an external memory via frame buffer logic. The method includes the steps of receiving a command from an arbiter unit, where the command has an associated memory address that includes a set identifier, a tag portion, and a sector identifier, extracting the set identifier, the tag portion, and the sector identifier from the associated memory address, determining whether one of the cache lines related to a set included in a data cache unit is affirmatively associated with the tag portion included in the associated memory address, and causing data associated with the command to be written to or received from a sector in an affirmatively associated cache line related to the set in the data cache unit. The sector corresponds to the sector identifier included in the associated memory address.

One advantage of the disclosed method is that the number and duration of halted or stalled read and write operations is reduced, relative to prior art approaches, as the tag look-up unit transmits a high-priority clean notification to the frame buffer logic when the number of affirmatively associated cache lines related to a particular set reaches a pre-determined high-priority clean threshold. The frame buffer logic then retrieves dirty data and transmits read data preemptively, thereby reducing the likelihood of read/write command stalls.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of ordinary skill in the art that the present invention may be practiced without one or more of these specific details. In other instances, well-known features have not been described in order to avoid obscuring the present invention.

System Overview

Figure 1:
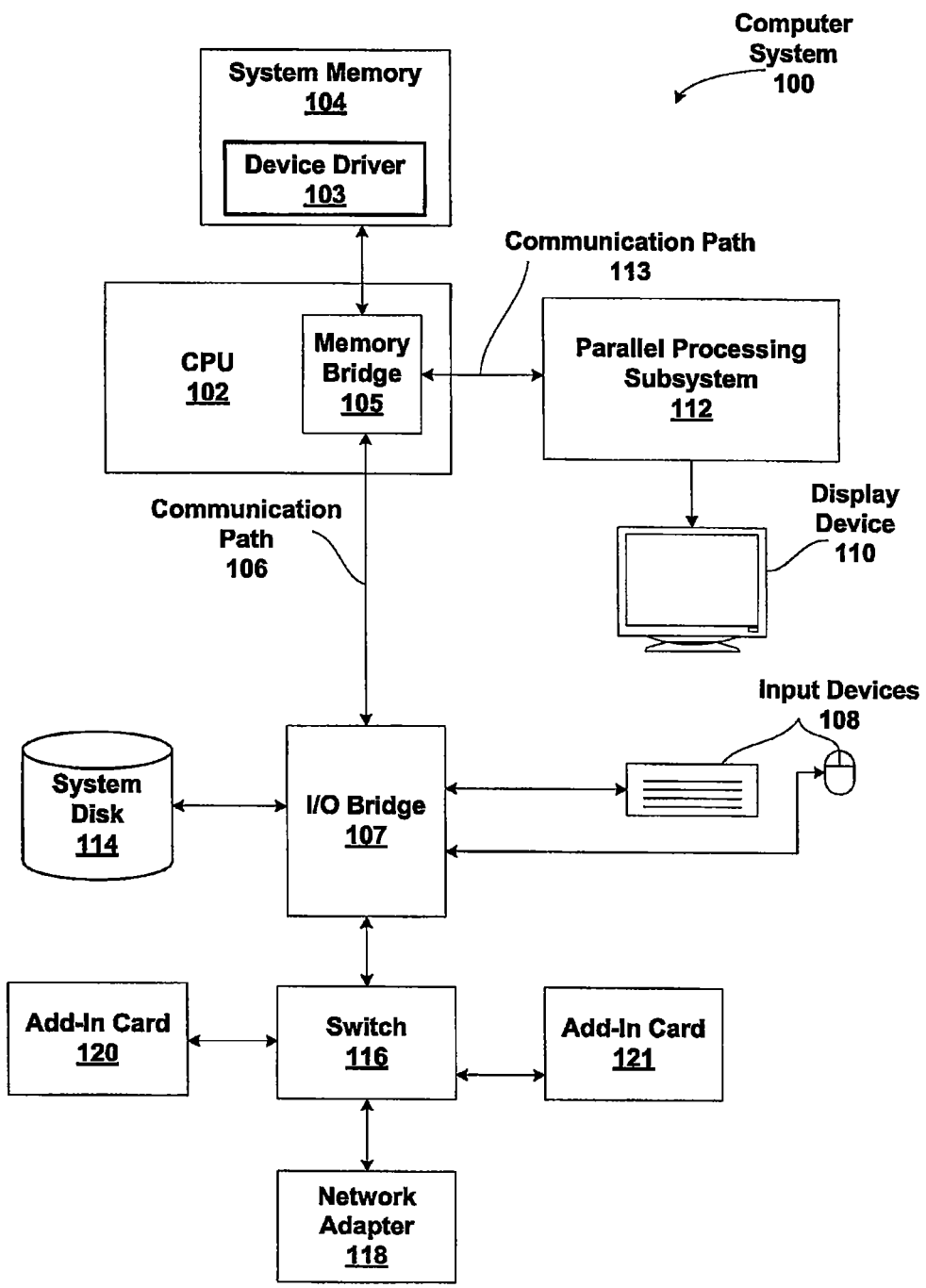
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a Peripheral Component Interconnect Express (PCIe), Accelerated Graphics Port (AGP), or HyperTransport link); in one embodiment parallel processing subsystem 112 is a graphics subsystem that delivers pixels to a display device 110 (e.g., a conventional CRT (cathode ray tube) or LCD (liquid crystal display) based monitor). A system disk 114 is also connected to I/O bridge 107. A switch 116 provides connections between I/O bridge 107 and other components such as a network adapter 118 and various add-in cards 120 and 121. Other components (not explicitly shown), including USB (Universal Serial Bus) or other port connections, CD (compact disc) drives, DVD (digital versatile disc) drives, film recording devices, and the like, may also be connected to I/O bridge 107. Communication paths interconnecting the various components in FIG. 1 may be implemented using any suitable protocols, such as PCI (Peripheral Component Interconnect), PCIe, AGP, HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
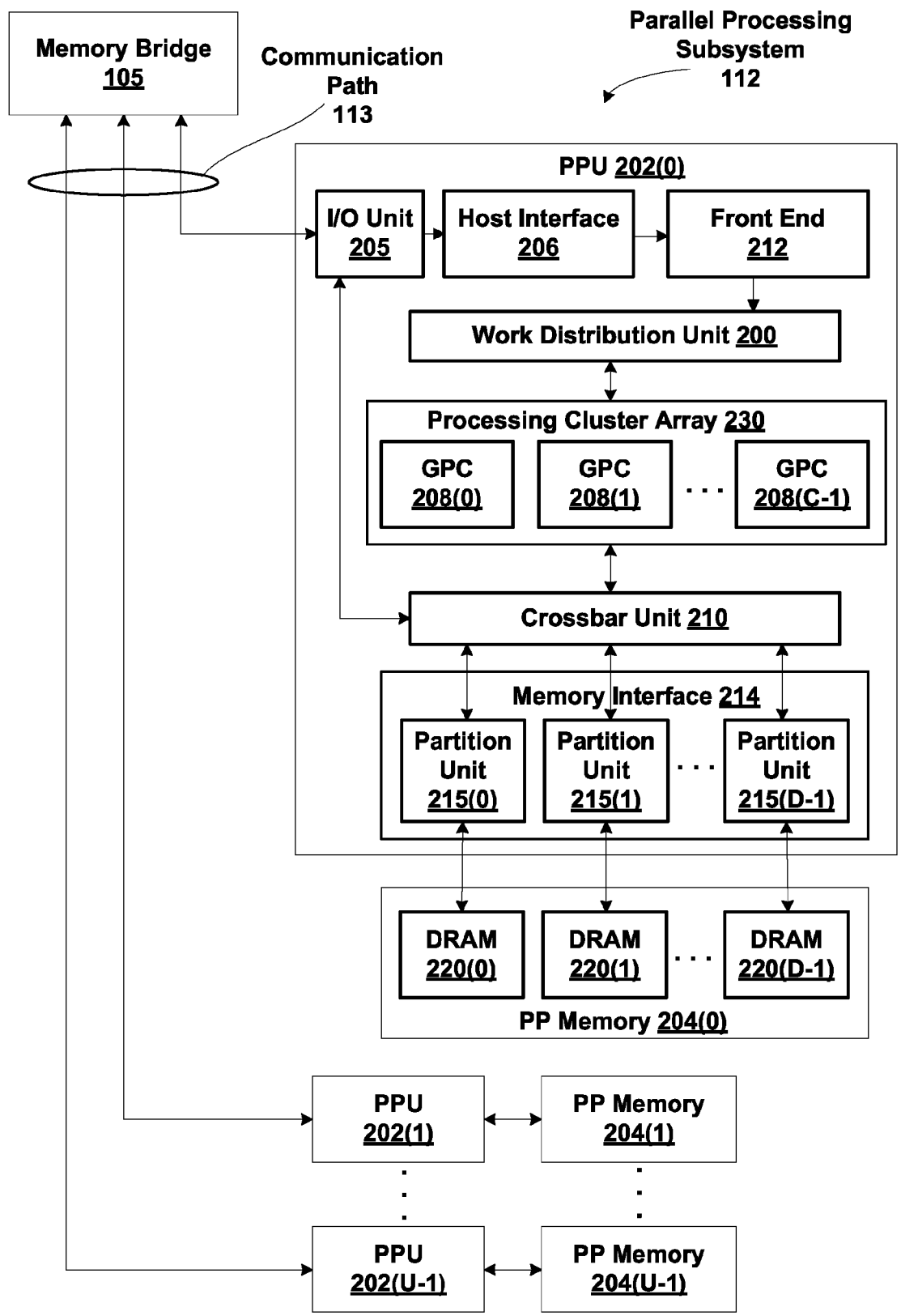
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCIe link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≧1. Each portion of parallel processing memory 204 generally includes one or more memory devices (e.g. DRAM 220). Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCIe) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
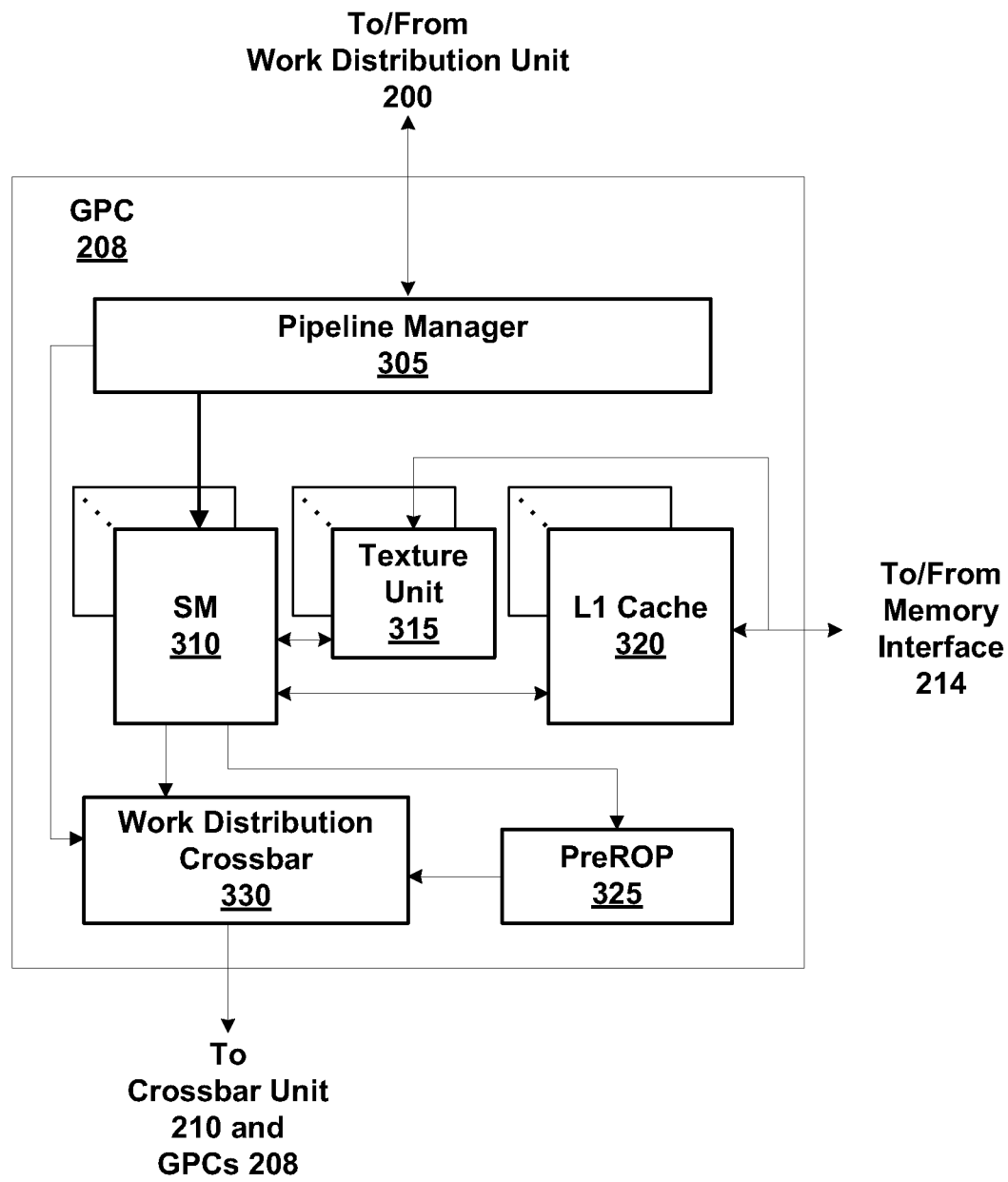
FIG. 3A is a block diagram of a general processing cluster within one of the parallel processing units of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

In graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≧1, each SM 310 configured to process one or more thread groups. Also, each SM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "thread group." As used herein, a "thread group" refers to a group of threads concurrently executing the same program on different input data, with each thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over multiple clock cycles. Since each SM 310 can support up to G thread groups concurrently, it follows that up to G×M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SM 310 uses space in a corresponding L1 cache 320 that is used to perform load and store operations. Each SM 310 also has access to L2 caches within the partition units 215 that are shared among all GPCs 208 and may be used to transfer data between threads. Finally, SMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) unit 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., SMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
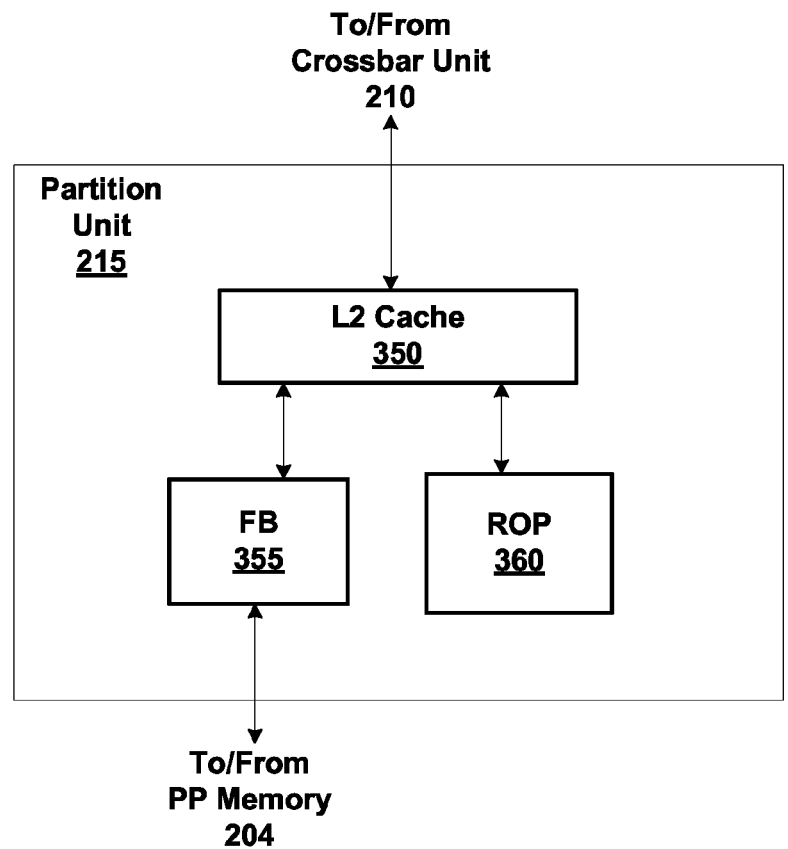
FIG. 3B is a block diagram of a partition unit within one of the parallel processing units of FIG. 2, according to one embodiment of the present invention.

FIG. 3B is a block diagram of a partition unit 215 within one of the PPUs 202 of FIG. 2, according to one embodiment of the present invention. As shown, partition unit 215 includes an L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons of ordinary skill in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing from the scope of the present invention.

Implementing Dirty Data Thresholds

Figure 4:
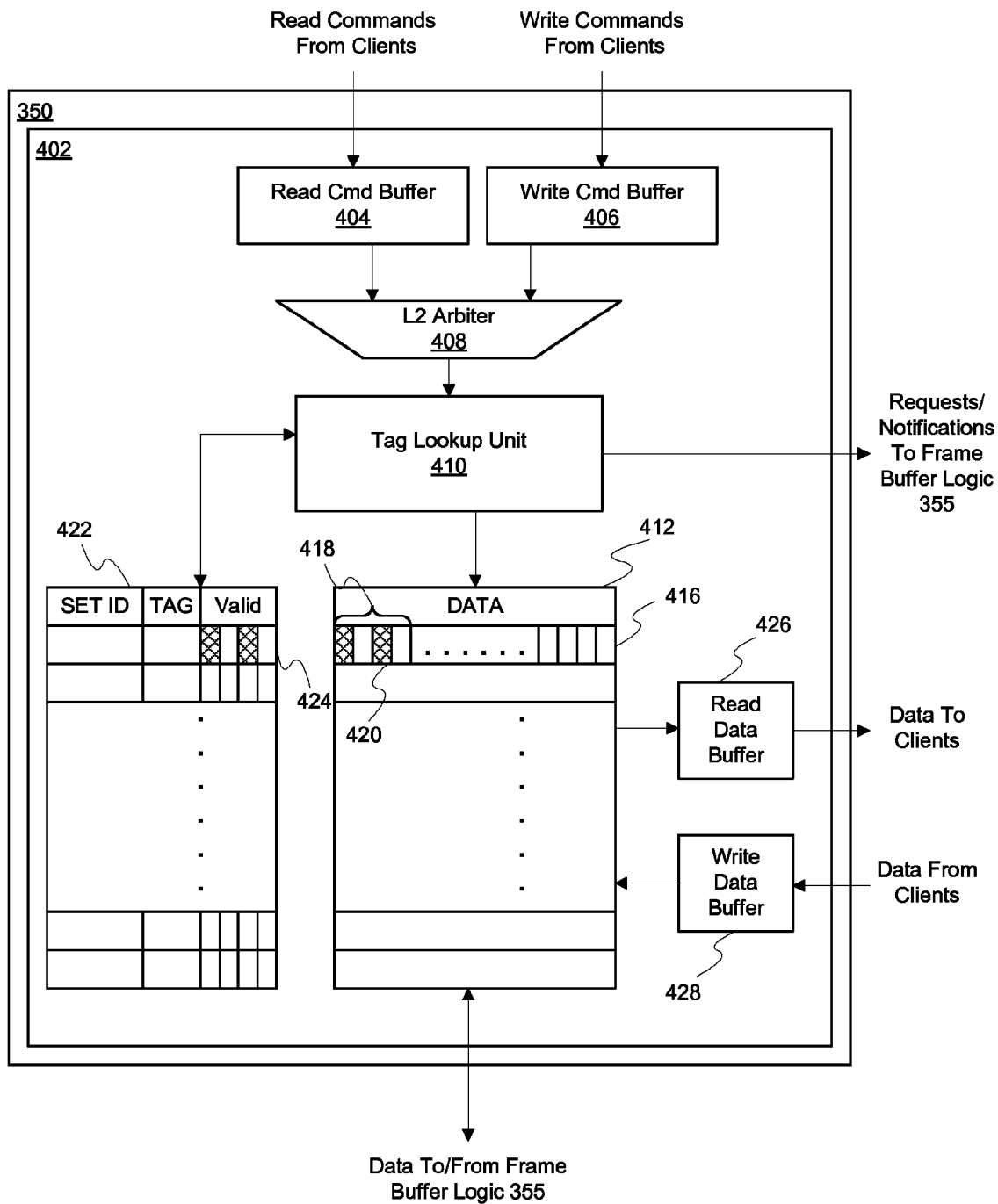
FIG. 4 is a detailed block diagram of a level 2 (L2) cache slice in the L2 cache of FIG. 3B, according to one embodiment of the present invention.

FIG. 4 is a detailed block diagram of an L2 cache slice 402 in the L2 cache 350 of FIG. 3B, according to one embodiment of the present invention. As described in conjunction with FIG. 3B, the L2 cache 350 may be split into two or more slices for more efficient processing of read and write commands. The L2 cache slice 402 is one such slice of the L2 cache 350. The L2 cache slice 402 includes a read command buffer 404, a write command buffer 406, an L2 arbiter unit 408, a tag look-up unit 410, a data cache unit 412, a tag store 422, a read data buffer 426 and a write data buffer 428.

In operation, the L2 cache slice 402 receives read and write commands from various clients within the parallel processing subsystem 112, such as the GPCs 208 and the ROP 360. The read command buffer 404 receives read commands from the various clients, and the write command buffer 406 receives write commands from those clients. The read command buffer 404 and write command buffer 406 are FIFO (first-in-first-out) buffers, that is, the commands received by the read command buffer 404 and write command buffer 406 are output in the order the commands are received from the clients. The read command buffer 404 and the write command buffer 406 are coupled to the L2 arbiter unit 408. The L2 arbiter unit 408 uses standard arbitration techniques to select a given command from the read command buffer 404 or the write command buffer 406 and transmit the selected command to the tag look-up unit 410 for processing.

Each read/write command received by the tag look-up unit 410 includes a memory address indicating the memory location within the DRAM 220 where the data associated with that read/write command is stored. The data associated with a write command is also transmitted to the write data buffer 428 for storage. Within the parallel processing subsystem 112, the L2 cache 350, among other uses, is used as an intermediary memory store for data associated with read/write commands being retrieved from or transmitted to the DRAM 220. The tag look-up unit 410 determines memory space availability within the data cache unit 412 to store the data associated with the read/write commands received from the L2 arbiter unit 408.

In one embodiment, the data cache unit 412 is a physically-indexed and tagged 64 KB (kilobyte) set associative data cache. In such an embodiment, the data cache unit 412 is divided into thirty-two sets, such as set 416, where each set is uniquely identified by a set identifier. Each set includes sixteen cache lines, such as cache line 418 in set 416, where each cache line may be affirmatively associated with a different memory address tag. Each cache line has four sectors of thirty-two bytes each, such as sector 420 in cache line 418. The data associated with one read/write command may be stored in a specific sector within a particular affirmatively associated cache line related to a specific set in the data cache unit 412.

Upon receiving a read/write command, the tag look-up unit 410 analyzes pre-determined portions of the memory address included in the read/write command to extract a set identifier, a tag portion and a sector identifier from the memory address. The extracted set identifier identifies a particular set within the data cache unit 412 (referred to herein as the "identified set") corresponding to the read/write command. The extracted tag portion of the memory address identifies a particular affirmatively associated cache line related to the identified set. The sector identifier identifies a specific sector (referred to herein as the "identified sector") within the affirmatively associated cache line where the data associated with the read/write command should be stored. The tag look-up unit 410 then determines whether a cache line related to the identified set is affirmatively associated with the extracted tag portion of the memory address included in the read/write command.

The tag look-up unit 410 searches the different entries of the tag store 422 to determine the sector and cache line availability related to a set of the data cache unit 412. The tag store 422 includes an entry for each of the sixteen cache lines within each set of the data cache unit 412. Each entry in the tag store 422 includes a set identifier section, a tag section and a line state section. The set identifier section stores the set identifier that corresponds to the set within the data cache unit 412 that includes the cache line corresponding to that entry. If the cache line corresponding to that entry is affirmatively associated with a particular tag portion of a memory address included in a previously received read/write command, then the tag section of that entry stores that particular tag portion of the memory address. If the cache line corresponding to that entry is not affirmatively associated, then the tag portion is empty.

The line state section in an entry indicates the state of each of the sectors in the cache line corresponding to that entry. For each sector, the line state section includes a full bit, a dirty bit, and a pinned bit. If a full bit is set, then the sector associated with that full bit in the cache line corresponding to the entry includes data. If the dirty bit is set, then the sector associated with that dirty bit in the cache line corresponding to the entry includes dirty data that is waiting to be transmitted to the DRAM 220 for storage. If the pinned bit is set, then the sector associated with that pinned bit in the cache line corresponding to the entry is reserved for data being retrieved from the DRAM 220. If the full bit, the dirty bit and the pinned bit are not set, then the sector associated with those bits in the cache line corresponding to the entry does not include any data and may be reserved for data associated with a read/write command. For example, if the entry 424 within the tag store 422 corresponds to the cache line 418 within the data cache unit 412, the set identifier section within the entry 424 stores the set identifier of the set 416. The tag section of the entry 424 stores the tag portion of the memory address included in a previously received read/write command affirmatively associated with the cache line 418. The line state section in the entry 424 indicates the presence of data within the four sectors of the cache line 418.

To determine whether a cache line related to the identified set is affirmatively associated with the extracted tag portion of the memory address included in the read/write command, the tag look-up unit 410 searches the set specified by the set identifier in the tag store 422 for an entry where the tag portion matches the extracted tag portion. When an entry in the tag store 422 matches in this fashion, the cache line corresponding to that entry is already affirmatively associated with the extracted tag portion of the memory address included in the read/write command. If such an entry does not exist in the tag store 422, then the tag look-up unit 410 searches the tag store 422 to determine how many of the cache lines included in the identified set are affirmatively associated with other tag portions of memory addresses included in any read/write commands previously received by the tag look-up unit 410. If a full bit in the line state section of an entry in the identified section of the tag store 422 is set, then the cache line corresponding to that entry is already affirmatively associated. If a dirty bit within the line state section of the entry is set, then the affirmatively associated cache line includes dirty data.

In the case of a write command, if the number of affirmatively associated cache lines related to the identified set that include dirty data is equal to a pre-determined maximum dirty threshold, then the tag look-up unit 410 stalls the write command until the number of affirmatively cache lines related to the identified set that store dirty data becomes less than the pre-determined maximum dirty threshold. As previously described, the L2 cache 350 is an intermediary store for data being retrieved from, in the case of read commands, and transmitted to, in the case of write commands, the DRAM 220. The L2 cache 350 also stores other types of data that is needed by the different components of the parallel processing subsystem 112, such as circular buffer data needed by the GPCs 208. The pre-determined maximum dirty threshold is a configurable threshold that prevents all the cache lines related to a particular set to be affirmatively associated so that a cache line is available to store dirty data that needs to be transmitted to the DRAM 220. Preventing all cache lines related to a particular set to be affirmatively associated in such a manner ensures cache line availability for other types of data that may be needed by the different components of the parallel processing subsystem 112.

In other embodiments of the present invention, the tag look-up unit 410, when processing a read/write command, may implement one or more different thresholds, where each threshold prevents all the cache lines related to a particular set to be affirmatively associated to store a different type of data. For example, the tag look-up unit 410 may implement a pre-determined maximum circular buffer (CB) threshold that limits the number of cache lines within a particular set that may be affirmatively associated by the tag look-up unit 410 to store CB data. In such a case, if the number of affirmatively associated cache lines related to the particular set that include CB data is equal to the pre-determined maximum CB threshold, then the tag look-up unit 410 would stall the read/write command until the number of affirmatively associated cache lines that include CB data is less than the pre-determined maximum CB threshold.

An entry in the tag store 422 where the set identifier section matches the extracted set identifier and the full bits in the line state section are clear corresponds to an available cache line related to the identified set. Available cache lines related to the identified set may be affirmatively associated with the different tag portions of memory addresses included in read/write commands. The tag look-up unit 410 selects an available cache line related to the identified set and affirmatively associates the selected cache line with the extracted tag portion of the memory address included in the read/write command. The tag section of the entry in the tag store 422 corresponding to the selected cache line is then updated to store the extracted tag portion of the memory address included in the read/write command.

Once an available cache line is affirmatively associated with the extracted tag portion of the memory address included in the read/write command, the tag look-up unit 410 reserves the identified sector in the affirmatively associated cache line for the data associated with the read/write command. To reserve the identified sector, the tag look-up unit 410 marks the corresponding full bit in the line state section of the entry in the tag store 422 corresponding to the affirmatively associated cache line as valid. If the read/write command is a read command, then the tag look-up unit 410 transmits a read fill request to the frame buffer logic 355 and sets the pinned bit. The read fill request is then transmitted to the DRAM 220 for processing at a later clock cycle. If the read/write command is a write command, the tag look-up unit 410 transmits a dirty data notification to the frame buffer logic 355. The tag look-up unit 410 then causes the data associated with the write command stored in the write data buffer 428 to be transmitted to the reserved sector within the affirmatively associated cache line. The data associated with the write command is stored in the reserved sector until the data is transmitted to the DRAM 220 for storage at a later clock cycle and the dirty bit is set.

After an available cache line is affirmatively associated, the tag look-up unit 410 determines if the number of affirmatively associated cache lines that include dirty data related to the identified set is greater than a pre-determined high-priority clean threshold. If so, then the tag look-up unit 410 transmits a high-priority clean notification to the frame buffer logic 355. The high-priority clean notification alerts the frame buffer logic 355 that the number of affirmatively associated cache lines that include dirty data related to the identified set is approaching the pre-determined maximum dirty threshold. In response to the high-priority clean notification, the frame buffer logic 355 can retrieve dirty data stored in the affirmatively associated cache lines related to the identified set. Once the frame buffer logic 355 has fetched the dirty data from a given sector in the cache, the dirty bit for the sector is cleared. Retrieving dirty data preemptively reduces the likelihood of read/write command stalls due to the pre-determined maximum dirty threshold being reached.

The frame buffer logic 355 prioritizes and processes dirty data notifications, read fill requests and high-priority clean notifications and transmits corresponding read/write commands to the DRAM 220. Data associated with a write command is retrieved from the corresponding sector in the data cache unit 412 and stored in the corresponding bank page within the DRAM 220, thereby cleaning that data. When dirty data is cleaned, the dirty bit within the line state section in the tag store 422 corresponding to the sector storing the clean data is cleared. The sector storing the clean data may be reserved to store data associated with a future read or write command. Data associated with the read command is retrieved from the corresponding bank page within the DRAM 220 and stored in the reserved sector within the data cache unit 412 associated with the read command. The data associated with the read command is then transmitted to the read data buffer 426 from the reserved sector, and the pinned bit within the line state section in the tag store 422 corresponding to the sector storing the data is cleared. The data associated with the read command is stored in the read data buffer 426 until the data is transmitted to the client that transmitted the read command.

When all the dirty and pinned bits within the line state section of an entry in the tag store 422 corresponding to the affirmatively associated cache line are cleared, the tag look-up unit 410 un-affirmatively associates (disassociates) the cache line with the memory address tag stored in the tag section of that entry. The tag section of that entry is set to zero, and the cache line corresponding to that entry may be affirmatively associated with a different memory address tag at a later clock cycle.

Upon receiving a read/write command, if the tag look-up unit 410 determines that a cache line related to the identified set is already affirmatively associated with the extracted tag portion of the memory address included in the read/write command, then the tag look-up unit 410 determines whether the identified sector in the affirmatively associated cache line is already reserved. If so, in the case of read commands, the tag look-up unit 410 causes the data stored in the identified sector to be transmitted to the read data buffer 426. The data is stored in the read data buffer 426 until that data is transmitted to the client that transmitted the read command. In the case of write commands, the tag look-up unit 410 causes the data associated with the write command stored in the write data buffer 428 to be transmitted to the reserved sector in the affirmatively associated cache line. If, however, the identified sector is not reserved, the tag look-up unit 410 reserves the identified sector and transmits a read fill request or a dirty data notification, as described previously herein.

In other embodiments, the line state section of an entry in the tag store 422 may be implemented in any technically feasible fashion, including, without limitation, as a single bit to indicate when data in the cache line corresponding to the entry is clean and unpinned. Persons skilled in the art will therefore understand that nothing included in the descriptions herein is intended to limit the scope of the present invention.

In certain embodiments, read commands may be transmitted to the L2 cache slice 402 by the clients within the parallel processing subsystem 112 where the data associated with those commands is retrieved from system memory 104 or a memory associated with another GPU (or PPU) within the computer system 100 and stored temporarily in the data cache unit 412, as opposed to being retrieved from the parallel processing memory 204 coupled to FB 355, as previously described herein. Similarly, in certain embodiments, write commands may be transmitted to the L2 cache slice 402 by the GPCs 208 or the ROP 360 where the data associated with those commands is temporarily stored in the data cache unit 412 before being written to system memory 104 or a memory associated with another GPU (or PPU) within the computer system 100, as opposed to being written to the parallel processing memory 204 coupled to FB 355, as previously described herein. In all such embodiments, the manner in which the data associated with the read or write commands is cached in and evicted from the data cache unit 412, as described herein, remains unchanged. Thus, all such embodiments fall within the scope of the present invention.

Figure 5:
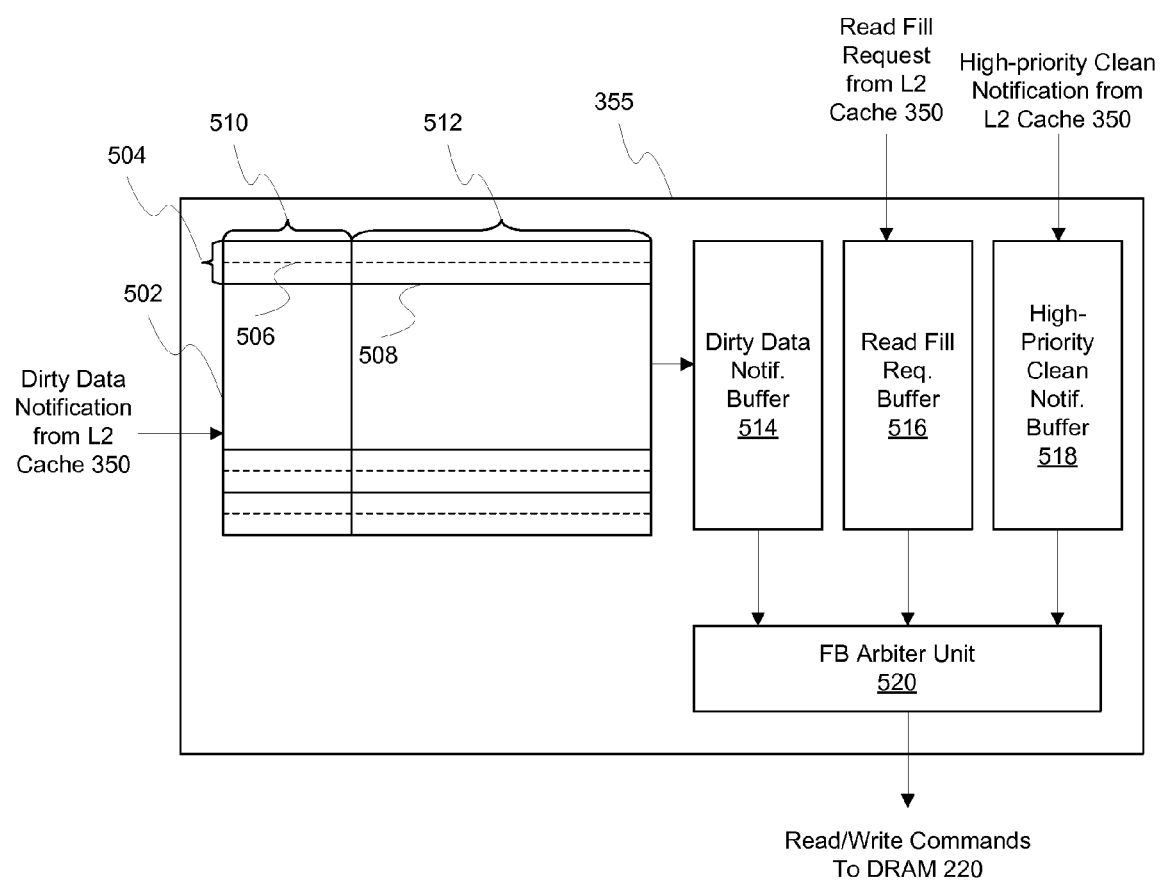
FIG. 5 is a detailed block diagram of the frame buffer logic of FIG. 3B, according to one embodiment of the present invention.

FIG. 5 is a detailed block diagram of the frame buffer logic 355 of FIG. 3B, according to one embodiment of the present invention. As shown, the frame buffer logic 355 includes a dirty data notifications sorter 502, a dirty data notifications buffer 514, a read fill requests buffer 516, a high-priority clean notifications buffer 518 and a frame buffer arbiter unit 520.

As described in conjunction with FIG. 4, the tag look-up unit 410 transmits a dirty data notification to the frame buffer logic 355 each time dirty data is written to a sector in the data cache unit 412. Using the dirty data notifications sorter 502, the frame buffer logic 355 is configured to manage the dirty data notifications received from the tag look-up unit 410. Again, the particular cache line in which dirty data is stored is determined by the tag look-up unit 410 using the memory address included in the write command associated with that dirty data. The memory address also reflects the particular data block within a bank page in the DRAM 220 where the dirty data should be stored.

The dirty data notifications sorter 502 includes thirty-two sets, such as set 504, each set including two entries, such as entries 506 and 508 within set 504. Each bank page in the DRAM 220 maps to only one set within the dirty data notifications sorter 502. Each entry in a set within the dirty data notifications sorter 502 may be affirmatively associated with one bank page in the DRAM 220 that maps to that set, such that, at any given clock cycle, a maximum of sixty-four bank pages may be tracked by the dirty data notifications sorter 502. An entry within the dirty data notifications sorter 502 includes a bank page number portion 510 and a notifications portion 512. An entry that is affirmatively associated with a specific bank page stores the bank page number identifying that bank page in the bank page number portion 510. The dirty data notifications received by the frame buffer logic 355 associated with that bank page are stored in the notifications portion 512.

Upon receiving a dirty data notification from the tag look-up unit 410, the frame buffer logic 355 analyzes the memory address included in the dirty data notification to extract the bank page number corresponding to the specific bank page in which the dirty data should be stored. The frame buffer logic 355 also extracts the set index within the dirty data notifications sorter 502 that should include the entry corresponding to that specific bank page. The frame buffer logic 355 then retrieves the entries that are within the set identified by the extracted set index. The frame buffer logic 355 compares the extracted bank page number with the bank page numbers included in the bank page number portion 510 of the entries retrieved from that set. In the case that the extracted bank page number matches a bank page number portion included in one of the entries in that set, the frame buffer logic 355 stores the dirty data notification in the notifications portion 512 of that entry. In the case that the extracted bank page number does not match a bank page number portion included in any of the entries in that set, an available entry in that set is affirmatively associated with the bank page associated with the extracted bank page number. The frame buffer logic 355 then stores the dirty data notification in the notifications portion 512 of the newly affirmatively associated entry.

The frame buffer logic 355 implements two configurable thresholds to manage the dirty data notifications stored in the dirty data notifications sorter 502. At any given clock cycle, the dirty data notifications sorter 502 determines the number of dirty data notifications stored in the notifications portion 512 of each affirmatively associated entry within the notifications sorter 502. For each affirmatively associated entry, if the number of dirty data notifications is greater than a predetermined notifications threshold, then the dirty data notifications sorter 502 transmits the dirty data notifications stored in the notifications portion 512 of that entry to the dirty data notifications buffer 514. The notifications threshold ensures that the number of dirty data requests transmitted by the frame buffer logic 355 to a bank page, once the bank page is activated, meet the minimum efficiency requirements of the DRAM 220. The notifications threshold also ensures that dirty data stored in the different sectors in the data cache unit 412 associated with a particular bank page is retrieved from the data cache unit 412 at the earliest possible clock cycle, thereby cleaning the sectors storing that dirty data.

Also, at any given clock cycle, the dirty data notifications sorter 502 determines the number of affirmatively associated entries in each set. If the number of affirmatively associated entries in a given set is greater than one, the dirty data notifications sorter 502 transmits the dirty data notifications stored in the notifications portion 512 of the older entry to the dirty data notifications buffer 514. This approach ensures that there is space availability in each set in the dirty data notifications sorter 502 for a different bank page that may be associated with that set.

The read fill requests transmitted by the tag look-up unit 410 when data associated with a read command is not available within the data cache unit 412 are stored in the read fill requests buffer 516. Similarly, the high-priority clean notifications transmitted by the tag look-up unit 410 when the number of affirmatively associated cache lines related to a particular set within the data cache unit 412 is equal to a high-priority clean threshold are stored in the high-priority clean notifications buffer 518.

The frame buffer arbiter unit 520 implements standard arbitration techniques to determine the order in which the requests/notifications stored in the dirty data notifications buffer 514, the read fill requests buffer 516 and the high-priority clean notifications buffer 518 are selected for further processing. In one embodiment, the frame buffer arbiter unit 520 selects the first request/notification stored in each of the dirty data notifications buffer 514, the read fill requests buffer 516 and the high-priority clean notifications buffer 518 in a round-robin fashion. In another embodiment, the frame buffer arbiter unit 520 may select notifications from the high-priority clean notifications buffer 518 at a higher priority than notifications/requests stored in the dirty data notifications buffer 514 and the read fill requests buffer 516. The frame buffer arbiter unit 520 transmits the read/write commands associated with the selected dirty data notification, read fill request or high-priority clean notification to the DRAM 220 for further processing.

Data associated with a write command is retrieved from the corresponding sector in the data cache unit 412 and stored in the corresponding bank page within the DRAM 220, thereby cleaning that data. When dirty data is cleaned, the dirty bit within the line state section in the tag store 422 corresponding to the sector storing the clean data is cleared. The sector storing the clean data may be reserved to store data associated with a future read or write command. Data associated with the read command is retrieved from the corresponding bank page within the DRAM 220 and stored in the reserved sector within the data cache unit 412 associated with the read command. When the data is stored in the reserved sector, the pinned bit within the line state section in the tag store 422 corresponding to the reserved sector is cleared. The data associated with the read command is then transmitted to the read data buffer 426 from the reserved sector until the data is transmitted to the client that transmitted the read command. When the data associated with the read command is transmitted to the read data buffer 426, the full bit within the line state section in the tag store 422 corresponding to the sector from which the data is transmitted is cleared.

Again, when all the dirty and pinned bits within the line state section of an entry in the tag store 422 corresponding to an affirmatively associated cache line are cleared, the tag look-up unit 410 may un-affirmatively associate (disassociate) the cache line with the tag portion of a memory address in the tag section of that entry so that the entry may be affirmatively associated with the tag portion of a different memory address included in a read/write command at a later clock cycle.

Figure 6A:
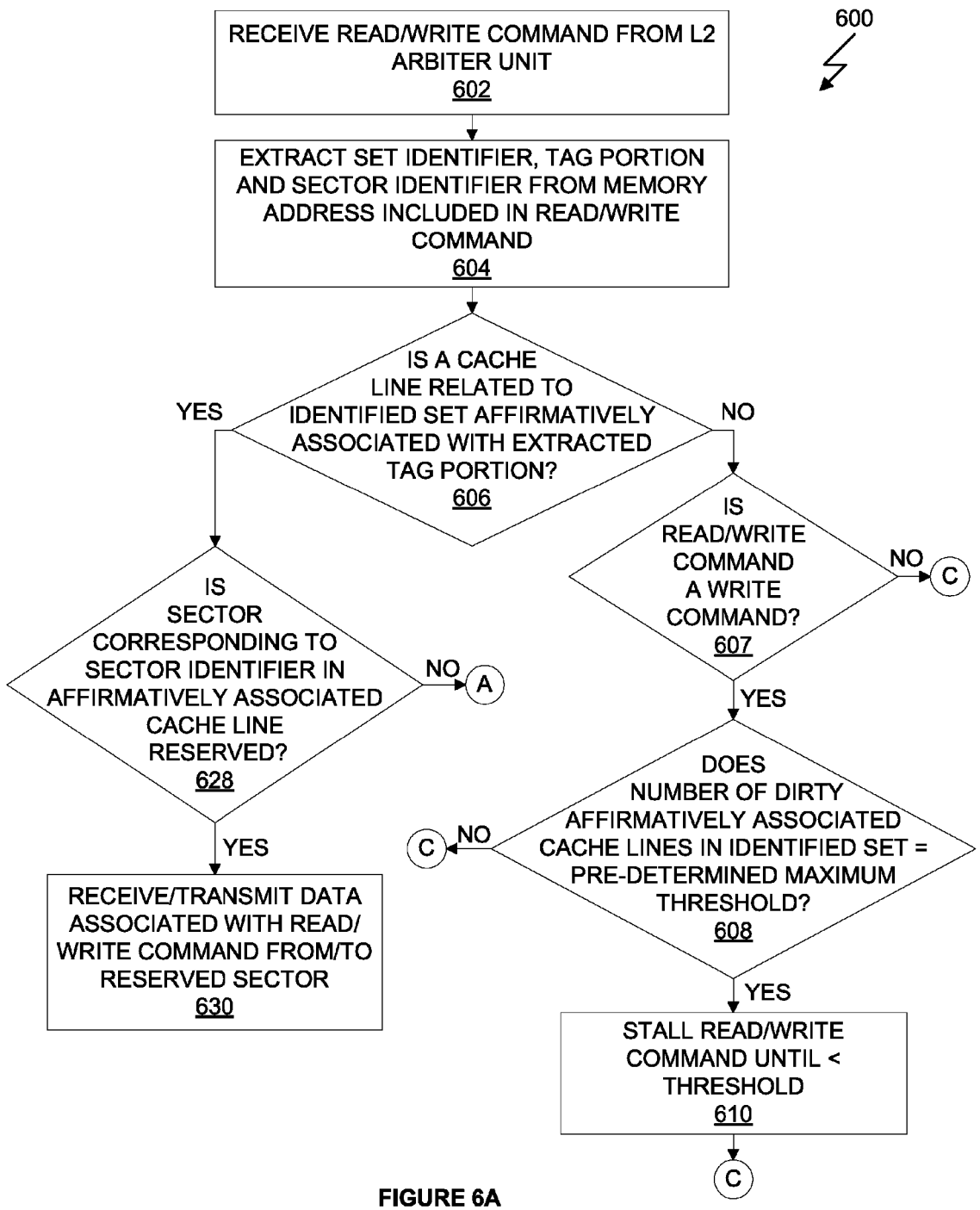
FIGS. 6A and 6B set forth a flow diagram of method steps for processing a read/write command received by the L2 cache slice of FIG. 4, according to one embodiment of the present invention.
Figure 6B:
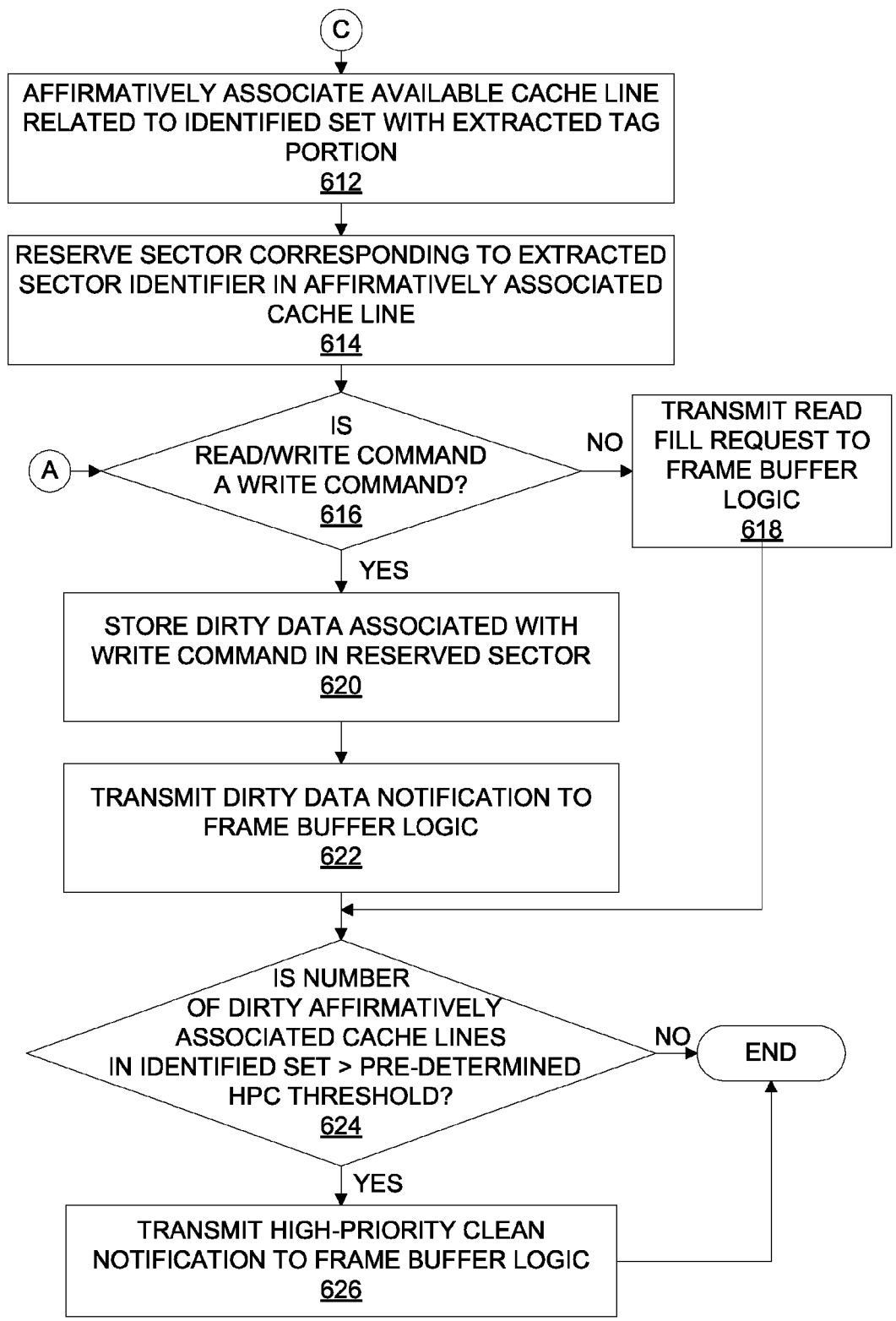

FIGS. 6A and 6B set forth a flow diagram of method steps for processing a read/write command received by the L2 cache slice 402 of FIG. 4, according to one embodiment of the present invention. Although the method steps are described in conjunction with the systems of FIGS. 1-4, persons of ordinary skill in the art will understand that any system configured to perform the method steps, in any order, is within the scope of the invention.

The method 600 begins at step 602, where the tag look-up unit 410 receives a read/write command from the L2 arbiter unit 408. As described in conjunction with FIG. 4, various clients within the parallel processing subsystem 112 may transmit read/write commands to the L2 cache slice 402 for processing. The read commands are stored in the read command buffer 404, and the write commands are stored in the write command buffer 406, until the commands are selected by the L2 arbiter unit 408 for processing. The L2 arbiter unit 408 selects a read/write command using standard arbitration techniques and transmits the selected read/write command to the tag look-up unit 410 for further processing.

At step 604, the tag look-up unit 410 extracts a set identifier, a tag portion and a sector identifier from the memory address included in the read/write command. As previously described, the extracted set identifier identifies the set in the data cache unit 412 that may include the memory address, and the extracted tag portion identifies a cache line within the data cache unit 412 that can be affirmatively associated with the tag portion of the memory address included in the read/write command. The data associated with the read/write command is stored in a specific sector, identified by the sector identifier, of the affirmatively associated cache line. At step 606, the tag look-up unit 410 searches the tag store 422 to determine whether a cache line related to the identified set is affirmatively associated with the extracted tag portion of the memory address. The tag look-up unit 410 examines the different entries in the set specified by the set identifier in tag store 422 to determine whether there is an entry where the tag section matches the extracted tag. As described herein, when the tag portion of the memory address matches a tag section in the specified set of the tag store 422 in this fashion, the cache line corresponding to that entry is already affirmatively associated with the tag portion of the memory address included in the read/write command. At step 606, if such an entry does not exist, then there is no cache line related to the identified set affirmatively associated with the extracted tag portion of the memory address included in the read/write command, and the method 600 proceeds to step 607.

At step 607, the tag look-up unit 410 determines whether the read/write command is a write command. If so, then the method 600 proceeds to step 608 where the tag look-up unit 410 searches the tag store 422 to determine how many of the cache lines in the identified set are affirmatively associated with the tag portions of the memory addresses included in any read/write commands previously received by the tag look-up unit 410 and include dirty data. If the number of affirmatively associated cache lines in the identified set that include dirty data is equal to a pre-determined maximum dirty threshold, then the method 600 proceeds to step 610. At step 610, the write command is stalled until the number of affirmatively associated cache lines in the identified set that include dirty data becomes less than the pre-determined maximum dirty threshold and the method 600 proceeds to step 612.

Referring back now to step 607, if the tag look-up unit 410 determines that the read/write command is a read command, then the method 600 proceeds directly to step 612, previously described herein. An entry in the specified set of the tag store 422 where the valid bits are cleared for all sectors corresponds to an available cache line in the identified set. An available cache line in the identified set may be affirmatively associated with the tag portion of a memory address included in a read/write command at a later clock cycle. Referring to FIG. 6B, at step 612, the tag look-up unit 410 selects an available cache line in the identified set and affirmatively associates the selected cache line with the tag portion of the memory address included in the read/write command and extracted at step 604. The tag section of the entry in the tag store 422 corresponding to the selected cache line in the identified set is updated to include the extracted tag portion of the memory address included in the read/write command. At step 614, the identified sector in the affirmatively associated cache line is reserved for the data associated with the read/write command. To reserve the identified sector, the tag look-up unit 410 sets the appropriate full bit in the line state section of the entry in the tag store 422 corresponding to the affirmatively associated cache line.

At step 616, the tag look-up unit 410 determines whether the read/write command is a write command. If so, then at step 620, the tag look-up unit 410 causes the data associated with the write command to be transmitted from the write data buffer 428 to the reserved sector. The tag look-up unit 410 then sets the dirty data bit in the line state section of the entry in the tag store 422 corresponding to the affirmatively associated cache line. At step 622, the tag look-up unit 410 transmits a dirty data notification to the frame buffer logic 355. The dirty data notification includes the memory address included in the write command and alerts the frame buffer logic 355 of the existence of dirty data stored in the newly reserved sector within the affirmatively associated cache line in the identified set. The frame buffer logic 355 prioritizes and processes the dirty data notification, and the data associated with the write command is retrieved and stored in the DRAM 220 at a later clock cycle.

If, at step 616, the tag look-up unit 410 determines that the read/write command is a read command, then at step 618, the tag look-up unit 410 transmits a read fill request to the frame buffer logic 355 and sets the pinned bit in the line state section of the entry in the tag store 422 corresponding to the affirmatively associated cache line. The read fill request includes the memory address included in the read command and notifies the frame buffer logic 355 that data associated with the read command needs to be retrieved from the DRAM 220 and stored in the newly reserved sector. The frame buffer logic 355 prioritizes and processes the read fill request and the data associated with the read command is returned and stored in the reserved sector at a later clock cycle.

At step 624, the tag look-up unit 410 searches the tag store 422 to determine how many of the cache lines in the identified set are affirmatively associated with the tag portions of the memory addresses included in any read/write commands previously received by the tag look-up unit 410. Because of the available cache line that was affirmatively associated at step 612 for the read/write command, the number of affirmatively associated cache lines related to the identified set is one more than the number of affirmatively associated cache lines determined at step 608. If, at step 624, the number of affirmatively associated cache lines that include dirty data and are in the identified set is greater than a pre-determined high-priority clean (HPC) threshold, then, at step 626, the tag look-up unit 410 transmits a high-priority clean notification to the frame buffer logic 355. The high-priority clean notification alerts the frame buffer logic 355 that the number of affirmatively associated cache lines in the set identified at step 604 that store dirty data is approaching the pre-determined maximum dirty threshold. In response to the high-priority clean notification, the frame buffer logic 355 can retrieve dirty data stored in the affirmatively associated cache lines in the identified set. Retrieving dirty data preemptively reduces the likelihood of read/write command stalls due to the pre-determined maximum dirty threshold being reached. After step 626, or if at step 624, the number of affirmatively associated cache lines in the identified set is less than or equal to the pre-determined high-priority clean threshold, then the method 600 terminates.

Referring back now to step 606 in FIG. 6A, if a cache line related to the identified set is already affirmatively associated with the extracted tag portion of the memory address included in the read/write command, then, at step 628, the tag look-up unit determines whether the sector in the affirmatively associated cache line identified by the extracted sector identifier is already reserved. If so, then at step 630, in the case of read commands, the tag look-up unit 410 causes the data stored in the identified sector to be transmitted to the read data buffer 426. The data is stored in the read data buffer 426 until that data is transmitted to the client that transmitted the read command. In the case of write commands, at step 630, the tag look-up unit 410 causes the data associated with the write command stored in the write data buffer 428 to be transmitted to the reserved sector in the affirmatively associated cache line. The tag look-up unit 410 then sets the dirty data bit in the line state section of the entry in the tag store 422 corresponding to the affirmatively associated cache line. However, if at step 628, the identified sector is not reserved, then the method 600 proceeds to step 616, previously described herein.

The dirty data notification transmitted to the frame buffer logic 355, at step 622, is stored in the dirty data notifications sorter 502 (FIG. 5). The dirty data notification is stored in the dirty data notifications sorter 502 until the dirty data clean request related to the dirty data notification is transmitted to the frame buffer arbiter unit 520 for further processing. The read fill request transmitted to the frame buffer logic 355, at step 618, is stored in the read fill requests buffer 516. Similarly, the high-priority clean notification transmitted to the frame buffer logic 355, at step 626, is stored in the high-priority clean notifications buffer 518. In one embodiment, the frame buffer arbiter unit 520 selects a request/notification from the dirty data notifications buffer 514, the read fill requests buffer 516 or the high-priority clean notifications buffer 518 in a round-robin fashion. In another embodiment, the frame buffer arbiter unit 520 selects high-priority clean notifications stored in the high-priority clean notifications buffer 518 at a higher priority than notifications/requests stored in the dirty data notifications buffer 514 or the read fill requests buffer 516. The frame buffer arbiter unit 520 then transmits read/write commands corresponding to the selected request/notification to the DRAM 220 for processing.

In sum, upon receiving a read/write command, the tag look-up unit analyzes pre-determined portions of the memory address included in the read/write command to extract a set identifier, a tag portion of the memory address and a sector identifier. The extracted set identifier identifies a particular set within the data cache unit, and the extracted tag portion of the memory address identifies a particular affirmatively associated cache line related to the identified set corresponding to the memory address. The sector identifier identifies a specific sector within the affirmatively associated cache line where the data associated with the read/write command should be stored. The tag look-up unit 410 first determines whether a cache line related to the identified set is affirmatively associated with the extracted tag portion of the memory address included in the read/write command. If such an affirmatively associated cache line exists, then the tag look-up unit reserves the identified sector within the affirmatively associated cache line to store the data associated with the read/write command.

If such an affirmatively associated cache line does not exist, then the tag look-up unit determines the number of affirmatively associated cache lines related to the identified set that include or store dirty data. Cache lines related to a particular set that are not dirty or pinned are available to be affirmatively associated with tag portions of memory addresses included in future read/write commands. At any given clock cycle, the number of affirmatively associated cache lines related to the identified set that store dirty data may not exceed a pre-determined maximum dirty threshold. In the case of write commands, if the number of affirmatively associated cache lines related to the identified set that store dirty data is equal to the pre-determined maximum dirty threshold, then the tag look-up unit stalls the write command until the number of affirmatively associated cache lines related to the identified set that store dirty data is less than the pre-determined maximum dirty threshold.

The tag look-up unit then affirmatively associates an available cache line related to the identified with the tag portion of the memory address included in the read/write command. The tag look-up unit then reserves the identified sector within the newly affirmatively associated cache line to store the data associated with the read/write command.

To reduce the number of stalls due to cache line unavailability, the tag look-up unit transmits a high-priority clean notification to the frame buffer logic when the number of dirty affirmatively associated cache lines related to the identified set reaches a pre-determined high-priority clean threshold. The high-priority clean notification alerts the frame buffer logic that the number of dirty affirmatively associated cache lines related to the identified set is approaching the pre-determined maximum dirty threshold. In response to the high-priority clean notification, the frame buffer logic can retrieve dirty data stored in the affirmatively associated cache lines related to the identified set. Retrieving dirty data preemptively, reduces the likelihood of read/write command stalls due to the pre-determined maximum dirty threshold being reached.

Advantageously, the number and duration of halted read and write operations is reduced as the tag look-up unit transmits a high-priority clean notification to the frame buffer logic when the number of dirty affirmatively associated cache lines related to a particular set reaches a pre-determined threshold. The frame buffer logic then retrieves dirty data and transmits read data preemptively, thereby reducing the likelihood of read/write command stalls. Further, the pre-determined threshold prevents all the cache lines related to a particular set to be affirmatively associated so that a cache line is available to store data that is retrieved from or needs to be transmitted to the DRAM. Such a mechanism helps ensure cache line availability for other types of data, such as circular buffer data, that may be needed by the different components of the parallel processing subsystem.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM (compact disc read only memory) disks readable by a CD-ROM drive, flash memory, ROM (read only memory) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for processing commands received by an intermediary cache unit from one or more clients, wherein the intermediary cache unit is coupled to an external memory via frame buffer logic, the method comprising the steps of:

receiving a command from an arbiter unit in the intermediary cache unit, wherein the command has an associated memory address that includes a set identifier, a tag portion, and a sector identifier;

extracting the set identifier, the tag portion, and the sector identifier from the associated memory address;

determining whether one of a plurality of cache lines in a set included in a data cache unit in the intermediary cache unit is affirmatively associated with the tag portion included in the associated memory address;

if one of the plurality of cache lines in the set is affirmatively associated with the tag portion included in the associated memory address, then causing data associated with the command to be written to or retrieved from a sector in an affirmatively associated cache line related to in the set in the data cache unit, wherein the sector corresponds to the sector identifier included in the associated memory address, and wherein the step of causing data associated with the command to be written to or read from the sector comprises transmitting a read fill request or a dirty data notification to the frame buffer logic, or if none of the plurality of cache lines in the set is affirmatively associated with the tag portion included in the associated memory address, then, determining that a number of dirty affirmatively associated cache lines in the set is less than a first threshold value, and affirmatively associating an available cache line in the set with the tag portion included in the associated memory address, wherein the frame buffer logic includes a dirty data notifications sorter configured to determine a number of dirty data notifications associated with each set and write data to the external memory when the number is above a threshold value;

determining that a number of dirty affirmatively associated cache lines in the set is greater than a second threshold value;

transmitting a high-priority clean notification to the frame buffer logic; and selecting either the high-priority clean notification, the read fill request or the dirty data notification from respective buffers for processing.

2. The method of claim 1, wherein the step of selecting occurs in a round-robin fashion across the respective buffers.

3. The method of claim 1, wherein priority is given to the high-priority clean notification, and wherein the step of selecting comprises selecting the high-priority clean notification prior to either the read fill request or the dirty data notification.

4. The method of claim 1, further comprising the step of reserving the sector in the affirmatively associated cache line in the set in the data cache unit by setting a pinned bit associated with the sector in a tag store coupled to the tag lookup unit.

5. The method of claim 4, further comprising the step of determining that the command is a read command, and wherein the step of causing data associated with the command to be written to or received from the sector comprises transmitting a read fill request to the frame buffer logic.

6. The method of claim 4, further comprising the steps of determining that the command is a write command, wherein the step of causing data associated with the command to be written to or read from the sector comprises causing dirty data associated with the command to be stored in the sector, and transmitting a dirty data notification to the frame buffer logic.

7. An intermediary cache unit coupled to an external memory via frame buffer logic and configured to process commands received from one or more clients, the intermediary cache unit comprising:
an arbiter unit configured to arbitrate between commands received from the one or more clients;
a data cache unit configured to store data related to the commands received from the one or more clients; and
a tag lookup unit coupled to the arbiter unit and the data cache unit and configured to:
receive a command from the arbiter unit, wherein the command has an associated memory address that includes a set identifier, a tag portion, and a sector identifier,
extract the set identifier, the tag portion, and the sector identifier from the associated memory address,
determine whether one of a plurality of cache lines in a set included in the data cache unit is affirmatively associated with the tag portion included in the associated memory address,
if one of the plurality of cache lines in the set is affirmatively associated with the tag portion included in the associated memory address, then cause data associated with the command to be written to or received from a sector in an affirmatively associated cache line in the set in the data cache unit, wherein the sector corresponds to the sector identifier included in the associated memory address, wherein causing data associated with the command to be written to or read from the sector comprises transmitting a read fill request or a dirty data notification to the frame buffer logic, or
if none of the plurality of cache lines in the set is affirmatively associated with the tag portion included in the associated memory address, then, determine that a number of dirty affirmatively associated cache lines in the set is less than a first threshold value, and affirmatively associate an available cache line in the set with the tag portion included in the associated memory address,
wherein the frame buffer logic includes a dirty data notifications sorter configured to determine a number of dirty data notifications associated with each set and write data to the external memory when the number is above a threshold value,
determine that a number of dirty affirmatively associated cache lines in the set is greater than a second threshold value,
transmit a high-priority clean notification to the frame buffer logic, and
select either the high-priority clean notification, the read fill request or the dirty data notification from respective buffers for processing.

8. The intermediary cache unit of claim 7, wherein the tag lookup unit is further configured to reserve the sector in the affirmatively associated cache line in the set in the data cache unit by setting a pinned bit associated with the sector in a tag store coupled to the tag lookup unit.

9. The intermediary cache unit of claim 8, wherein the tag lookup unit is further configured to determine that the command is a read command, and, in causing data associated with the command to be written to or received from the sector, to transmit a read fill request to the frame buffer logic.

10. The intermediary cache unit of claim 8, wherein the tag lookup unit is further configured to determine that the command is a write command, and wherein causing data associated with the command to be written to or read from the sector comprises storing dirty data associated with the command in the sector and transmitting a dirty data notification to the frame buffer logic.

11. A computing device, comprising:
one or more clients;
a crossbar unit;
an external memory;
a frame buffer logic; and
an intermediary cache unit coupled to the one or more clients via the crossbar unit and to the external memory via the frame buffer logic and configured to process commands received from the one or more clients, the intermediary cache unit including:
an arbiter unit configured to arbitrate between commands received from the one or more clients,
a data cache unit configured to store data related to the commands received from the one or more clients, and
a tag lookup unit coupled to the arbiter unit and the data cache unit and configured to:
receive a command from the arbiter unit, wherein the command has an associated memory address that includes a set identifier, a tag portion, and a sector identifier,
extract the set identifier, the tag portion, and the sector identifier from the associated memory address,
determine whether one of a plurality of cache lines in a set included in the data cache unit is affirmatively associated with the tag portion included in the associated memory address, and
if one of the plurality of cache lines in the set is affirmatively associated with the tag portion included in the associated memory address, then cause data associated with the command to be written to or received from a sector in an affirmatively associated cache line in the set in the data cache unit, wherein the sector corresponds to the sector identifier included in the associated memory address, or
if none of the plurality of cache lines in the set is affirmatively associated with the tag portion included in the associated memory address, then, determining determine that a number of dirty affirmatively associated cache lines in the set is less than a first threshold value, and affirmatively associate an available cache line in the set with the tag portion included in the associated memory address,
wherein the frame buffer logic includes a dirty data notifications sorter configured to determine a number of dirty data notifications associated with each set and write data to the external memory when the number is above a threshold value, and wherein, in causing data associated with the command to be written to or read from the sector, the tag lookup unit is further configured to transmit a read fill request, a dirty data notification or a high-priority clean notification to the frame buffer logic, wherein the high-priority clean notification indicates that a number of dirty affirmatively associated cache lines in the set is greater than a second threshold value.

12. The computing device of claim 11, wherein the frame buffer logic includes a second arbiter configured to select for processing from a read fill requests buffer, a dirty data notifications buffer, and a high-priority clean notifications buffer within the frame buffer logic in a round robin fashion across the respective buffers.

13. The computing device of claim 12, wherein the second arbiter is further configured to give priority to the high-priority clean notifications buffer such that the second arbiter selects from the high-priority clean notifications buffer prior to either the read fill requests buffer or the dirty data notifications buffer.

* * * * *

UNITED STATES PATENT AND TRADEMARK OFFICE
CERTIFICATE OF CORRECTION

PATENT NO. : 8,464,001 B1  
APPLICATION NO. : 12/331305  
DATED : June 11, 2013  
INVENTOR(S) : Edmondson et al.

Page 1 of 1

It is certified that error appears in the above-identified patent and that said Letters Patent is hereby corrected as shown below:

Title Page, Assignee item (73):

Please insert --, CA (US)-- after Santa Clara;

Claims:

Column 22, Claim 11, Line 61, please delete "determining".

Signed and Sealed this  
Twenty-ninth Day of October, 2013

Teresa Stanek Rea  
*Deputy Director of the United States Patent and Trademark Office*